United States Patent

Cowie

(10) Patent No.: US 8,714,750 B2
(45) Date of Patent: May 6, 2014

(54) DISPLAYING PROJECTOR STATUS VISIBLY

(75) Inventor: Robert Steven Cowie, Escondido, CA (US)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 12/691,236

(22) Filed: Jan. 21, 2010

(65) Prior Publication Data

US 2011/0176063 A1    Jul. 21, 2011

(51) Int. Cl.
  *G09G 3/14*   (2006.01)
  *G03B 21/20*  (2006.01)
  *H04N 9/31*   (2006.01)

(52) U.S. Cl.
  USPC ............................... 353/85; 353/122; 345/46

(58) Field of Classification Search
  USPC ........... 353/69, 70, 85, 122; 348/734; 345/39, 345/46
  See application file for complete search history.

(56) References Cited

U.S. PATENT DOCUMENTS

| | | | |
|---|---|---|---|
| 6,680,579 B2 * | 1/2004 | Allen et al. | 315/169.3 |
| 7,290,885 B2 | 11/2007 | Salvatori et al. | |
| 2002/0031224 A1 * | 3/2002 | Basawapatna et al. | 380/211 |
| 2003/0093813 A1 * | 5/2003 | Shintani et al. | 725/133 |
| 2004/0041989 A1 * | 3/2004 | Olson et al. | 353/122 |
| 2005/0007561 A1 * | 1/2005 | Koyama et al. | 353/94 |
| 2005/0151934 A1 * | 7/2005 | Akutsu | 353/69 |
| 2006/0050245 A1 * | 3/2006 | Arai et al. | 353/85 |
| 2007/0165144 A1 * | 7/2007 | Bennett et al. | 348/734 |

FOREIGN PATENT DOCUMENTS

| | | |
|---|---|---|
| JP | 7209749 | 8/1995 |
| JP | 21305654 | 11/2001 |

OTHER PUBLICATIONS

Dixons, "Optoma LR4DM RF Projectors RSX", http://www.dixons.com.uk/martprd/product/seo/Computing/Monitors+and+Projectors/Projectors+Accessories/Optoma/LR4DM+RF/921573#productInformationSection.

* cited by examiner

*Primary Examiner* — William C Dowling
*Assistant Examiner* — Ryan Howard
(74) *Attorney, Agent, or Firm* — Sony Corporation

(57) ABSTRACT

The status of a ceiling mounted projector is provided. Status is provided wirelessly to a remote control (RC) of the projector. Or, status is projected on the screen using a separate projection method such as a laser or light emitting diode (LED), which projects a color corresponding to status or which projects the status using words.

18 Claims, 2 Drawing Sheets

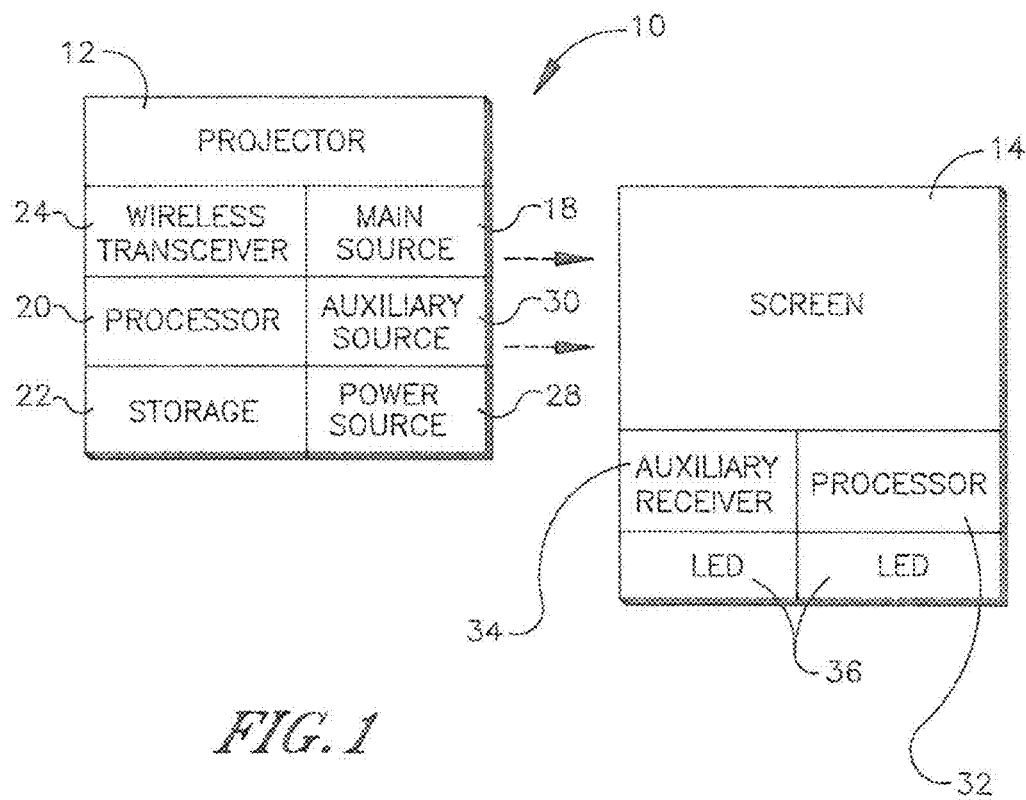
FIG. 1
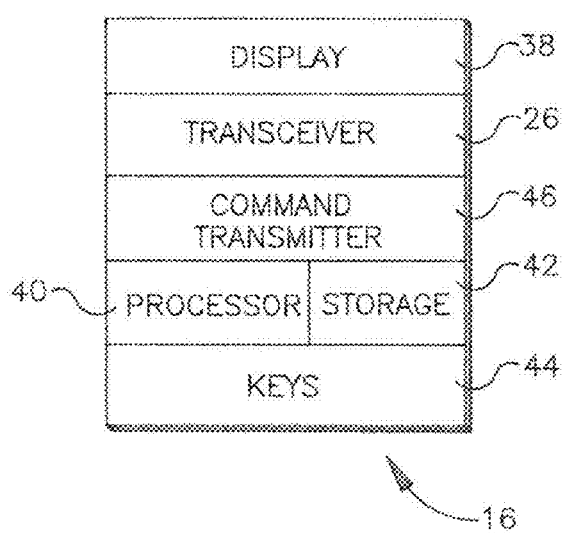
REMOTE CONTROL

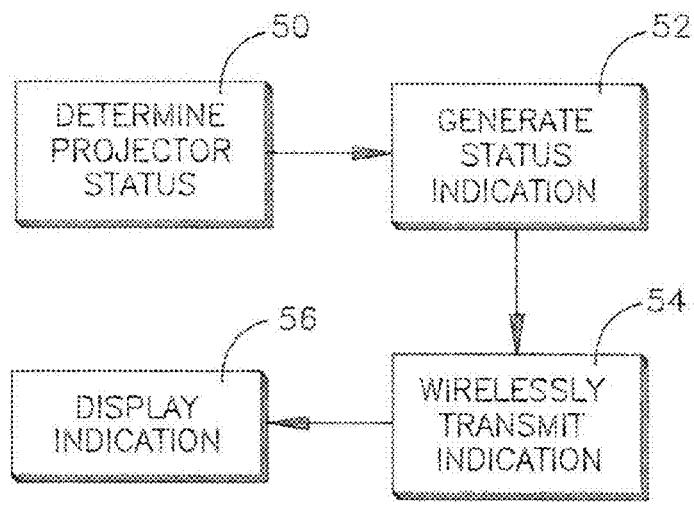
FIG. 2  OVERALL LOGIC
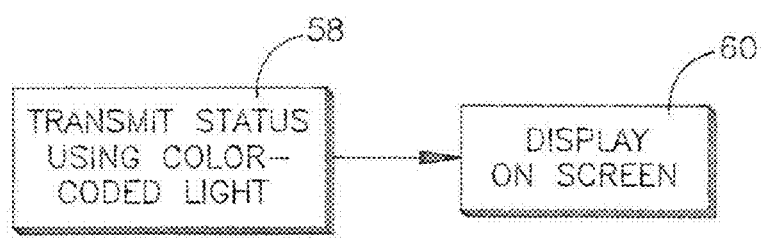
FIG. 3
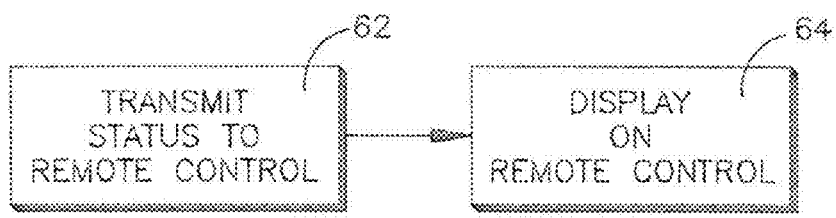
FIG. 4

DISPLAYING PROJECTOR STATUS VISIBLY

I. FIELD OF THE INVENTION

The present application is directed to visibly displaying the status such as "standby" of a projector on a device such as a screen or remote control (RC) distanced from the projector.

II. BACKGROUND OF THE INVENTION

Overhead projectors are conveniently used in meeting rooms to project visual images onto a screen that is easily viewed by all participants. Typically, a talk may be given during the presentation and when, for instance, the projector is used to present a slide show, the projector may be idle for a period that exceeds a threshold, causing the projector to enter a low power or standby state.

Accordingly, as understood herein projectors can enter a standby mode or some state in which it is difficult to see what is happening with the projector. Being uncertain of the projector state, a person in the room might be caused to turn it off and on trying to get it to work without understanding the circumstances that resulted in the projector seemingly becoming non-functional. Accordingly, present principles are directed to providing a visual indication of projector state so that a person can easily understand what state the projector is in and whether there is an issue requiring user attention.

SUMMARY OF THE INVENTION

Accordingly, an image projector includes an image transmitter wirelessly projecting images onto a display surface. The image projector has an operational state and a standby state. The projector has a state transmitter that is different from the image transmitter and that wirelessly transmits state signals to a component distanced from the image projector to cause the component to present a visual indication of a state of the image projector.

In one example embodiment, the component is a remote control (RC) configured to send wireless commands to the projector. The RC includes a display presenting the state signals to a person. The display can be a screen display, or the display can include, e.g., first and second light emitting diodes (LED) each having a respective color, with the first LED being illuminated in response to a first state signal and the second LED being illuminated in response to a second state signal.

In another example, the state transmitter includes a laser and the component is the screen. The laser projects light having a first color onto the screen to indicate a first state of the projector, and projects light having a second color onto the screen to indicate a second state of the projector. Or, the state transmitter can project an alpha-numeric message onto the screen indicating the state of the projector. Yet again, the screen can be associated with first and second light emitting diodes (LED) each having a respective color, with the first LED being illuminated in response to a first state signal from the state transmitter and the second LED being illuminated in response to a second state signal from the state transmitter.

In another aspect, a method includes projecting images from a projector onto a display surface. The method also includes wirelessly transmitting a status signal from a projector to a component. The signal indicates that the projector is in a low power standby mode. An indication is presented on the component based on the signal that the projector is in the standby mode.

In another aspect, an assembly includes a projector including an image transmitter configured for wirelessly projecting images onto a display surface. A state transmitter is associated with the projector and is configured for wirelessly sending state signals to a component to cause the component to display respective indications of respective states of the projector. A remote control (RC) is configured to send wireless operational commands to the projector to control operation thereof.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart of example overall logic in accordance with present principles;

FIG. 3 is a flow chart of example logic of a first embodiment; and

FIG. 4 is a flow chart of example logic of a second embodiment.

DETAILED DESCRIPTION OF THE PREFERRED EMBODIMENT

Referring initially to FIG. 1, an assembly is shown, generally designated 10, that includes a projector 12 which may be ceiling-mounted and a display surface 14 such as a display screen onto which images from the projector 12 are presented. A remote control (RC) 16 can be manipulated by a person to wirelessly send command signals to the projector 12 to control operation thereof, e.g., to cause the projector to play a video, pause the video, go to a next slide, go to a previous slide, etc.

FIG. 1 shows that the projector 12 typically includes a main source 18 of projection images. Without limitation the main source 18 can be a projector optical system including a main light bulb that projects images onto the display surface 14 or a radiofrequency (RF) transmitter such as a 60 GHz transmitter that sends RF signals to the display surface 14, whose receiving and processing system converts into images that are presented on the display surface 14.

The main source 18 typically is controlled by a projector processor 20 accessing a computer readable storage medium 22 such as disk-based or solid state storage. The processor 20 may receive signals from a wireless transceiver 24 that receives wireless operational commands from a transceiver 26 in the RC 16. An AC or DC power source 28 in the projector 12 supplies electrical power to the components of the projector 12.

The projector 12 may have an auxiliary source 30 of wireless signals. Essentially, the auxiliary source 30, which is separate from the main source 18 in example non-limiting embodiments, establishes a state transmitter in that, under control of the projector processor 20, the source 30 sends wireless signals to the RC 16 and/or display surface 14 that represent a status of the projector. Example statuses include standby mode, entering standby mode, transitioning from standby mode to full power mode, full power mode, and main source 18 inoperable (e.g., projector bulb has failed).

In example embodiments, the auxiliary source 30 may be established by a short range RF transceiver such as a Bluetooth transceiver. In other embodiments the auxiliary source 30 may be established by lasers emitting different color wavelengths.

Particularly when lasers are not used in the projector 12 as described below but RF projector status signals are sent instead using, e.g., Bluetooth, the display surface 14 may include a display processor 32 receiving signals from an auxiliary signal (status signal) receiver 34. Plural differently-colored light emitting diodes (LED) 36 can be associated with the display surface 14 by, e.g., incorporating the LEDs into or onto the surface, for purposes to be shortly disclosed.

In addition to the transceiver 26, the RC 16 may include a visual display 38 controlled by a RC processor 40 accessing a computer readable storage medium 42. In response to signals input by a person manipulating control keys 44 on the RC 16, the RC processor 40 can cause a command transmitter or transceiver 46 to send wireless command signals to the wireless receiver or transceiver 24 of the projector 12, to control the projector 12. LEDs 48 of differing colors may be provided on the RC 16 in addition to or alternatively to the display 38 for purposes to be shortly disclosed.

Turning now to FIG. 2, at block 50 the projector processor 20 determines the operational status of the projector 12, e.g., if the projector 12 is in the standby mode, is entering the standby mode, is transitioning from the standby mode to the full power mode, if the projector 12 is in the full power mode, and if the main source 18 is inoperable. A status indication signal is generated accordingly at block 52 and wirelessly transmitted to the display surface 14 and/or to the RC 16 at block 54. An indication of the operational status of the projector is displayed in response at block 56 by the display surface 14 and/or RC 16.

When the display surface 14 is used to display the projector status, the status signal is transmitted by the auxiliary source 30 of the projector 12 at block 58 in FIG. 3, and presented on the display surface 14 at block 60. When lasers are used to establish the auxiliary source 30, a first status signal is represented by a first laser color and a second status signal is represented by a second laser color, and the laser color correlated to the present status of the projector 12 is projected against the surface 14. By way of non-limiting example, orange can indicate that the projector 12 is entering into the standby mode, yellow can indicate that the projector 12 is transitioning out of standby into full power mode, and red can indicate that the main source 18 is inoperable. In this way, a person viewing the display surface 14 can ascertain by the color of the laser dot appearing thereon what the status of the projector 12 is.

On the other hand, when an RF transceiver is used to establish the auxiliary source 30, the status signal from the source 30 that is received by the display processor 32 via the display receiver 34 commands the processor to illuminate the appropriately colored LED 36, i.e., the LED having the color correlated to the status indicated by the status signal. By way of non-limiting example, an illuminated orange LED can indicate that the projector 12 is entering into the standby mode, an illuminated yellow LED can indicate that the projector 12 is transitioning out of standby into full power mode, and an illuminated red LED can indicate that the main source 18 is inoperable. In this way, a person viewing the LEDs 36 associated with the display surface 14 can ascertain by the color of the LED illuminated thereon what the status of the projector 12 is.

Yet again, the auxiliary source 30 may simply be a light source that projects text in the form of alpha-numeric characters onto the display surface 14 stating what the status is of the projector 12.

In addition or in lieu of presenting projector status indications on the display surface 14, projector status may be presented on the display 38 of the RC 16. Accordingly, the auxiliary source 30 may be established by, e.g., a Bluetooth transceiver which sends projector status signals to the RC 16 at block 62 of FIG. 4. The signals are used by the RC processor 40 at block 64 in FIG. 4 to present, on the RC display 38, alpha-numeric characters stating what the status is of the projector 12. Yet again, the projector can transmit its status to the PC using WiDI or Wireless HDMI.

The LEDs 48 alternatively may be used on the RC 16 to indicate projector status in accordance with principles above.

While the particular DISPLAYING PROJECTOR STATUS VISIBLY is herein shown and described in detail, it is to be understood that the subject matter which is encompassed by the present invention is limited only by the claims.

What is claimed is:

1. An image projector comprising:
   an image transmitter configured to transmit images onto a display surface, wherein the images are transmitted as radio frequency signals; and
   a state transmitter different from the image transmitter and configured to wirelessly transmit status signals to a component distanced from the image projector to cause the component to present a visual indication of a status of the image projector,
   wherein the component is the display surface and the display surface is associated with at least a first and a second light emitting diodes (LED) each having a respective color, wherein the first LED is illuminated in response to a first status signal from the state transmitter, and the second LED is illuminated in response to a second status signal from the state transmitter, and wherein illumination of the first LED and the second LED is controlled by a display processor of the display surface.

2. The image projector of claim 1, further comprising a remote control (RC) configured to send wireless commands to the image projector, wherein the RC comprises a display presenting the status signals.

3. The image projector of claim 2, wherein the display is a screen display.

4. The image projector of claim 2, wherein the display comprises at least a first and a second light emitting diode (LED) each having a respective color, wherein the first LED is illuminated in response to a first status signal, and the second LED is illuminated in response to a second status signal.

5. The image projector of claim 1, wherein the state transmitter comprises a laser and the component is the display surface, the laser projecting light having a first color onto the display surface to indicate a first status of the image projector, the laser projecting light having a second color onto the display surface to indicate a second status of the image projector.

6. The image projector of claim 1, wherein the state transmitter projects an alpha-numeric message onto the display surface indicating the status of the image projector.

7. The image projector of claim 1, wherein the display surface comprises a display processor configured to convert the received radio frequency signals to the images for display.

8. A method comprising:
   transmitting images from a projector onto a display surface, wherein the images are transmitted as radio frequency signals;

wirelessly transmitting a status signal from the projector to a component, the status signal indicating a status of the projector; and presenting an indication on the component based on the status signal, wherein the component is a remote control (RC) configured to send wireless commands to the projector, the RC including a display presenting projector status indications, and wherein the display comprises at least a first and a second light emitting diode (LED) each having a respective color, wherein the first LED is illuminated in response to a first status signal from the projector, and the second LED is illuminated in response to a second status signal from the projector.

9. The method of claim 8, wherein the display is a screen display.

10. The method of claim 8, wherein the projector comprises a laser, the laser projecting light having a first color onto the display surface to indicate a first status of the projector, the laser projecting light having a second color onto the display surface to indicate a second status of the projector.

11. The method of claim 8, wherein the projector projects an alphanumeric message onto the display surface indicating the status of the projector.

12. The method of claim 8, wherein the display surface is associated with at least a first and a second light emitting diode (LED) each having a respective color, wherein the first LED is illuminated in response to a first status signal from the projector, and the second LED is illuminated in response to a second status signal from the projector, and wherein illumination of the first LED and the second LED is controlled by a display processor of the display surface.

13. The method of claim 8, wherein the display surface comprises a display processor configured to convert the received radio frequency signals to the images for display.

14. An assembly comprising:
a projector comprising an image transmitter configured to wirelessly transmit images onto a display surface, wherein the images are transmitted as radio frequency signals;
a remote control (RC) configured to send wireless operational commands to the projector to control operation thereof; and
a state transmitter associated with the projector and configured to wirelessly send status signals to the RC to cause the RC to display indications of a status of the projector,
wherein the state transmitter is a short range radio frequency (RF) transmitter, wherein the RF transmitter causes a first and a second light emitting diode (LED) on the RC to respectively illuminate in response to first and second status signals.

15. The assembly of claim 14, wherein the state transmitter comprises a laser.

16. The assembly of claim 14, wherein the RF transmitter sends the status signals causing a first and a second light emitting diode (LED) on the display surface to respectively illuminate in response to first and second status signals, and wherein illumination of the first LED and the second LED is controlled by a display processor of the display surface.

17. The assembly of claim 14, wherein the RF transmitter causes a display on the RC to present an alphabetic indication of the status of the projector.

18. The assembly of claim 14, wherein the display surface comprises a display processor configured to convert the received radio frequency signals to the images for display.

* * * * *